United States Patent
Bai et al.

(10) Patent No.: US 9,900,802 B2
(45) Date of Patent: Feb. 20, 2018

(54) DATA TRANSMISSION METHOD AND APPARATUS, BASE STATION, AND USER EQUIPMENT

(71) Applicant: Huawei Technologies Co., Ltd., Shenzhen, Guangdong (CN)

(72) Inventors: Wei Bai, Shenzhen (CN); Chen Chi, Shenzhen (CN); Guanglin Han, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 99 days.

(21) Appl. No.: 14/981,006

(22) Filed: Dec. 28, 2015

(65) Prior Publication Data

US 2016/0112900 A1 Apr. 21, 2016

Related U.S. Application Data

(63) Continuation of application No. PCT/CN2013/078456, filed on Jun. 28, 2013.

(51) Int. Cl.
| | |
|---|---|
| *H04L 12/28* | (2006.01) |
| *H04W 28/06* | (2009.01) |
| *H04L 1/00* | (2006.01) |
| *H04L 12/741* | (2013.01) |
| *H04L 12/823* | (2013.01) |

(Continued)

(52) U.S. Cl.
CPC ......... *H04W 28/06* (2013.01); *H04L 1/0007* (2013.01); *H04L 1/0017* (2013.01); *H04L 45/74* (2013.01); *H04L 47/32* (2013.01); *H04L 47/365* (2013.01); *H04L 67/322* (2013.01); *H04L 69/22* (2013.01);

(Continued)

(58) Field of Classification Search
None
See application file for complete search history.

(56) References Cited

U.S. PATENT DOCUMENTS 6,754,215 B1 * 6/2004 Arikawa ............. H04L 12/5601
370/395.4
7,737,870 B1 * 6/2010 Wang ..................... H03M 7/40
341/50

(Continued)

FOREIGN PATENT DOCUMENTS

| CN | 101527834 A | 9/2009 |
|---|---|---|
| CN | 101646077 A | 2/2010 |

(Continued)

OTHER PUBLICATIONS

"Advanced video coding for generic audiovisual services", Recommendation ITU-T H.264, Apr. 2013, 732 pages.

*Primary Examiner* — Anh-Vu Ly

(57) ABSTRACT

A data transmission method and apparatus, a base station, and a user equipment are disclosed. The method includes: obtaining a size and priority information of a first data packet that needs to be transmitted; determining a transmission bandwidth used for transmitting the first data packet; if the transmission bandwidth is less than the size of the first data packet and active packet discarding is allowed according to the priority information of the first data packet, processing the size of the data packet to obtain a second data packet, where a size of the second data packet is less than the transmission bandwidth; and sending the second data packet to a user equipment by using the transmission bandwidth.

14 Claims, 7 Drawing Sheets

(51) Int. Cl.
    *H04L 29/06* (2006.01)
    *H04W 28/20* (2009.01)
    *H04L 29/08* (2006.01)
    *H04L 12/805* (2013.01)
    *H04W 88/02* (2009.01)
    *H04W 88/08* (2009.01)
(52) U.S. Cl.
    CPC ............ *H04W 28/20* (2013.01); *H04W 88/02* (2013.01); *H04W 88/08* (2013.01)

(56) References Cited

U.S. PATENT DOCUMENTS

| | | | | |
|---|---|---|---|---|
| 2003/0095551 | A1* | 5/2003 | Gotoh | H04L 47/10 370/395.3 |
| 2006/0056300 | A1* | 3/2006 | Tamura | H04L 12/5602 370/235 |
| 2007/0076680 | A1* | 4/2007 | Amram | H04L 1/0083 370/349 |
| 2008/0101409 | A1* | 5/2008 | West | H04L 29/06027 370/473 |
| 2009/0303947 | A1* | 12/2009 | Karino | H04L 47/26 370/329 |
| 2010/0241759 | A1* | 9/2010 | Smith | H04L 47/10 709/233 |
| 2013/0185794 | A1* | 7/2013 | Park | H04W 12/12 726/22 |
| 2014/0369355 | A1* | 12/2014 | Hori | H04L 69/14 370/392 |

FOREIGN PATENT DOCUMENTS

| | | |
|---|---|---|
| CN | 101778426 A | 7/2010 |
| CN | 102148674 A | 8/2011 |
| CN | 102244608 A | 11/2011 |
| CN | 102946570 A | 2/2013 |

* cited by examiner

DATA TRANSMISSION METHOD AND APPARATUS, BASE STATION, AND USER EQUIPMENT

CROSS-REFERENCE TO RELATED APPLICATIONS

This application is a continuation of International Application No. PCT/CN2013/078456, filed on Jun. 28, 2013, which is hereby incorporated by reference in its entirety.

TECHNICAL FIELD

The present invention relates to the field of communication technologies, and in particular, to a data transmission method and apparatus, a base station, and a user equipment.

BACKGROUND

In an acknowledged mode (AM, Acknowledged Mode) of a Universal Mobile Telecommunications System (UMTS, Universal Mobile Telecommunications System), to transmit data between two radio link control (RLC, Radio Link Control) entities, a sender first sends RLC protocol data unit (PDU, Protocol Data Unit) data, which includes a poll (POLL) request; then a receiver feeds back a PDU reception status (Status PDU) according to the poll request, so as to inform the sender of PDUs that have been received and PDUs that have been lost; the sender performs selective retransmission according to the PDU reception status fed back by the receiver. To reduce the number of retransmission times and decrease a delay, the sender may actively send the Status PDU to request the receiver to move a receive window thereof, and delete a data packet to be retransmitted on the sender.

This technology can solve only a problem of a wait for retransmission at an RLC layer. In the Transmission Control Protocol (TCP, Transmission Control Protocol), a packet discarded actively at the RLC layer may lead to retransmission at a TCP layer, thereby resulting in a more severe delay. On the other hand, in the Real-Time Transport Protocol (RTP, Real-time Transport Protocol), an out-of-order RTP packet is also rearranged at an RTP layer; if a data packet is lost, a timer is also started, and the data packet is submitted to an upper layer again when waiting for the data packet already discarded actively at the RLC layer times out, thereby causing an unnecessary delay.

Another active packet discarding method is a TCP proxy method. A TCP proxy is established on an evolved NodeB (eNB, evolved NodeB) side to buffer a TCP stream transmitted by a server (Server); a new TCP connection is established between a user equipment (UE, User Equipment) and the eNB, and data to be transmitted is selected from a cache for sending, thereby achieving the purpose of active packet discarding.

However, in such a technical solution with the TCP proxy, a base station requires extra processing time and extra storage space to establish a new TCP connection. For a video application with a high requirement on real-time transmission reestablishment of a TCP connection causes an unnecessary delay and occupies an air interface resource.

SUMMARY

Embodiments of the present invention provide a data transmission method and apparatus, a base station, and a user equipment, so as to solve technical problems of reduced transmission efficiency and an increased delay in the prior art.

To solve the foregoing technical problems, the embodiments of the present invention disclose the following technical solutions:

A first aspect provides a data transmission method, where the method includes:

obtaining a size and priority information of a first data packet that needs to be transmitted;

determining to-be-used-for-transmission bandwidth used for transmitting the first data packet;

if the to-be-used-for-transmission bandwidth is less than the size of the first data packet and it is determined, according to the priority information of the first data packet, that active packet discarding is allowed, processing the size of the first data packet to obtain a second data packet, where a size of the second data packet is less than the to-be-used-for-transmission bandwidth; and sending the second data packet to a user equipment by using the to-be-used-for-transmission bandwidth.

In a first possible implementation manner of the first aspect, the processing the size of the first data packet to obtain a second data packet includes:

reserving header information of the first data packet, and replacing a payload of the first data packet with a filled bit or supplemental enhancement information SEI to form the second data packet.

With reference to the first aspect or the first possible implementation manner of the first aspect, in a second possible implementation manner, the processing the size of the first data packet to obtain a second data packet includes:

replacing a payload of the first data packet with a filled bit or supplemental enhancement information SEI of a same length and check information, compressing the filled bit or supplemental enhancement information SEI and the check information that are used for the replacement, and modifying header information of the first data packet, to obtain the second data packet.

With reference to the first aspect or the first or the second possible implementation manner of the first aspect, in a third possible implementation manner, the modifying header information of the first data packet includes:

calculating a checksum of the first data packet that is obtained after the payload of the first data packet is replaced with the filled bit or supplemental enhancement information SEI of the same length and the check information; and adding the checksum to the header information of the first data packet.

With reference to the first aspect or the first, the second or the third possible implementation manner of the first aspect, in a fourth possible implementation manner, the determining to-be-used-for-transmission bandwidth used for transmitting the first data packet includes:

obtaining a current channel state and available channel bandwidth that is allocated; and determining the to-be-used-for-transmission bandwidth used for transmitting the first data packet according to the current channel state and the available channel bandwidth.

With reference to the first aspect or the first, the second, the third or the fourth possible implementation manner of the first aspect, in a fifth possible implementation manner, after the determining to-be-used-for-transmission bandwidth used for transmitting the first data packet, the method further includes:

if the to-be-used-for-transmission bandwidth is not less than the size of the first data packet, transmitting the first data packet by using the to-be-used-for-transmission bandwidth; or if the to-be-used-for-transmission bandwidth is less than the size of the first data packet and the active packet discarding is not allowed according to a priority of the first data packet, transmitting partial content of the first data packet or waiting for next transmission.

A second aspect provides a data transmission method, where the method includes:

receiving a data packet sent by a base station, where the data packet is a data packet obtained by processing according to to-be-used-for-transmission bandwidth;

recovering a filled bit or supplemental enhancement information SEI in the data packet; and discarding the filled bit in the data packet during a playing, or performing playing processing according to the SEI.

In a first possible implementation manner of the second aspect, the method further includes:

determining whether the data packet is a compressed data packet, and if the data packet is a compressed data packet, decompressing the data packet to obtain the filled bit or supplemental enhancement information SEI in the data packet.

A third aspect provides a data transmission apparatus, where the apparatus includes:

an obtaining unit, configured to obtain a size and priority information of a first data packet that needs to be transmitted;

a determining unit, configured to determine to-be-used-for-transmission bandwidth used for transmitting the first data packet;

a processing unit, configured to: if the to-be-used-for-transmission bandwidth is less than the size of the first data packet and it is determined, according to the priority information of the first data packet, that active packet discarding is allowed, process the size of the first data packet to obtain a second data packet, where a size of the second data packet is less than the to-be-used-for-transmission bandwidth; and a first sending unit, configured to send the second data packet to a user equipment by using the to-be-used-for-transmission bandwidth.

In a first possible implementation manner of the third aspect, the processing unit further includes:

a reserving unit, configured to: when the to-be-used-for-transmission bandwidth is less than the size of the first data packet and the active packet discarding is allowed according to the priority information of the first data packet, reserve header information of the first data packet; and a first replacing unit, configured to: when the reserving unit reserves the header information of the first data packet, replace a payload of the first data packet with a filled bit or supplemental enhancement information SEI to form the second data packet.

With reference to the third aspect or the first possible implementation manner of the third aspect, in a second possible implementation manner, the processing unit includes:

a second replacing unit, configured to: when the to-be-used-for-transmission bandwidth is less than the size of the first data packet and the active packet discarding is allowed according to the priority information of the first data packet, replace a payload of the first data packet with a filled bit or supplemental enhancement information SEI of a same length and check information;

a compressing unit, configured to compress the filled bit or supplemental enhancement information SEI and the check information that are used for the replacement by the second replacing unit; and a modifying unit, configured to modify header information of the first data packet to obtain the second data packet.

With reference to the third aspect or the first or the second possible implementation manner of the third aspect, in a third possible implementation manner, the modifying unit includes:

a calculating unit, configured to calculate a checksum of the first data packet that is obtained after the payload of the first data packet is replaced with the filled bit or supplemental enhancement information SEI of the same length and the check information; and an adding unit, configured to add the checksum to the header information of the first data packet.

With reference to the third aspect or the first, the second or the third possible implementation manner of the third aspect, in a fourth possible implementation manner, the determining unit includes:

an obtaining unit, configured to obtain a current channel state and available channel bandwidth that is allocated; and a determining subunit, configured to determine the to-be-used-for-transmission bandwidth used for transmitting the first data packet according to the current channel state and the available channel bandwidth.

With reference to the third aspect or the first, the second, the third or the fourth possible implementation manner of the third aspect, in a fifth possible implementation manner, the apparatus further includes:

a first judging unit, configured to: after the determining unit determines the to-be-used-for-transmission bandwidth used for transmitting the first data packet, determine whether the to-be-used-for-transmission bandwidth is less than the size of the first data packet; and send, to a second sending unit, a result of the determining indicating that the to-be-used-for-transmission bandwidth is not less than the size of the first data packet, or send, to a second judging unit, a result of the determining indicating that the to-be-used-for-transmission bandwidth is less than the size of the first data packet;

the second sending unit, configured to transmit the first data packet by using the to-be-used-for-transmission bandwidth when receiving the result of the determining that is sent by the first judging unit and indicates that the to-be-used-for-transmission bandwidth is not less than the size of the first data packet;

the second judging unit, configured to: continue to determine whether the active packet discarding is allowed according to a priority of the first data packet when receiving the result of the determining that is sent by the first judging unit and indicates that the to-be-used-for-transmission bandwidth is less than the size of the first data packet; and send, to the processing unit, a result of the determining indicating that the active packet discarding is allowed according to the priority of the first data packet, or send, to a third sending unit, a result of the determining indicating that the active packet discarding is not allowed according to the priority of the first data packet;

the processing unit, further configured to process the size of the first data packet according to the to-be-used-for-transmission bandwidth to obtain the second data packet when receiving the result of the determining that is sent by the second judging unit and indicates that the active packet discarding is allowed according to the priority of the first data packet; and the third sending unit, configured to transmit partial content of the first data packet or wait for next transmission when receiving the result of the determining that is sent by the second judging unit and indicates that the active packet discarding is not allowed according to the priority of the first data packet.

A fourth aspect provides a data transmission apparatus, where the apparatus includes:

a receiving unit, configured to receive a data packet sent by a base station, where the data packet is a data packet obtained by processing according to to-be-used-for-transmission bandwidth;

a recovering unit, configured to recover a filled bit or supplemental enhancement information SEI in the data packet; and a playing unit, configured to discard the filled bit in the data packet during a playing, or perform playing processing according to the SEI.

In a first possible implementation manner of the fourth aspect, the apparatus further includes:

a judging unit, configured to determine whether the data packet is a compressed data packet, and send, to a decompressing unit, a result of the determining indicating that the data packet is a compressed data packet; and the decompressing unit, configured to decompress the data packet to obtain the filled bit or supplemental enhancement information SEI in the data packet when receiving the result of the determining that is sent by the judging unit and indicates that the data packet is a compressed data packet.

A fifth aspect provides a base station, including:

a processor, configured to: obtain a size and priority information of a first data packet that needs to be transmitted; determine to-be-used-for-transmission bandwidth used for transmitting the first data packet; and when the to-be-used-for-transmission bandwidth is less than the size of the first data packet and it is determined, according to the priority information of the first data packet, that active packet discarding is allowed, process the size of the first data packet to obtain a second data packet, where a size of the second data packet is less than the to-be-used-for-transmission bandwidth; and a transceiver, configured to send the second data packet to a user equipment by using the to-be-used-for-transmission bandwidth.

In a first possible implementation manner of the fifth aspect, the transceiver is further configured to obtain a current channel state and available channel bandwidth that is allocated; and the processor is further configured to determine the to-be-used-for-transmission bandwidth used for transmitting the first data packet according to the current channel state and the available channel bandwidth.

With reference to the fifth aspect or the first possible implementation manner of the fifth aspect, in a second possible implementation manner, that the processor processes the size of the first data packet to obtain the second data packet includes that:

the processor reserves header information of the first data packet, and replaces a payload of the first data packet with a filled bit or supplemental enhancement information SEI to form the second data packet.

With reference to the fifth aspect or the first or the second possible implementation manner of the fifth aspect, in a third possible implementation manner, that the processor processes the size of the first data packet to obtain the second data packet includes that:

the processor replaces a payload of the first data packet with a filled bit or supplemental enhancement information SEI of a same length and check information, compresses the filled bit or supplemental enhancement information SEI and the check information that are used for the replacement, and modifies header information of the first data packet, to obtain the second data packet.

With reference to the fifth aspect or the first or the second or the third possible implementation manner of the fifth aspect, in a fourth possible implementation manner, that the processor modifies the header information of the first data packet includes that:

the processor calculates a checksum of the first data packet that is obtained after the payload of the first data packet is replaced with the filled bit or supplemental enhancement information SEI of the same length and the check information, and adds the checksum to the header information of the first data packet.

With reference to the fifth aspect or the first, the second, the third or the fourth possible implementation manner of the fifth aspect, in a fifth possible implementation manner, the processor is further configured to: after determining the to-be-used-for-transmission bandwidth used for transmitting the first data packet, determine whether the to-be-used-for-transmission bandwidth is less than the size of the first data packet; if the to-be-used-for-transmission bandwidth is not less than the size of the first data packet, control the transceiver to transmit the first data packet by using the to-be-used-for-transmission bandwidth; if the to-be-used-for-transmission bandwidth is less than the size of the first data packet, continue to determine whether the active packet discarding is allowed according to the priority information of the first data packet; if the active packet discarding is allowed according to the priority information of the first data packet, process the size of the first data packet according to the to-be-used-for-transmission bandwidth to obtain the second data packet; and if the active packet discarding is not allowed according to the priority information of the first data packet, control the transceiver to transmit partial content of the first data packet or wait for next transmission.

A sixth aspect provides a user equipment, including:

a transceiver, configured to receive a data packet sent by a base station, where the data packet is a data packet obtained by processing according to to-be-used-for-transmission bandwidth; and a processor, configured to recover a filled bit or supplemental enhancement information SEI in the data packet, and discard the filled bit in the data packet during a playing, or perform playing processing according to the SEI.

In a first possible implementation manner of the sixth aspect, the processor is further configured to: determine whether the data packet is a compressed data packet; and if the data packet is a compressed data packet, decompress the data packet to obtain the filled bit or supplemental enhancement information SEI in the data packet.

It can be known from the foregoing technical solutions that, in the embodiments of the present invention, when a size of a data packet that needs to be transmitted is greater than to-be-used-for-transmission bandwidth, a payload of the data packet is replaced, so that a size of a data packet obtained after the replacement is less than to-be-used-for-transmission bandwidth, thereby facilitating transmission of the data packet. This solves technical problems of low data transmission efficiency and an increased transmission delay in the prior art. Especially in a case in which resources are limited, a burden of an air interface can be lowered, transmission efficiency is improved, and a retransmission delay is reduced, thereby increasing service quality of video transmission.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following descriptions show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
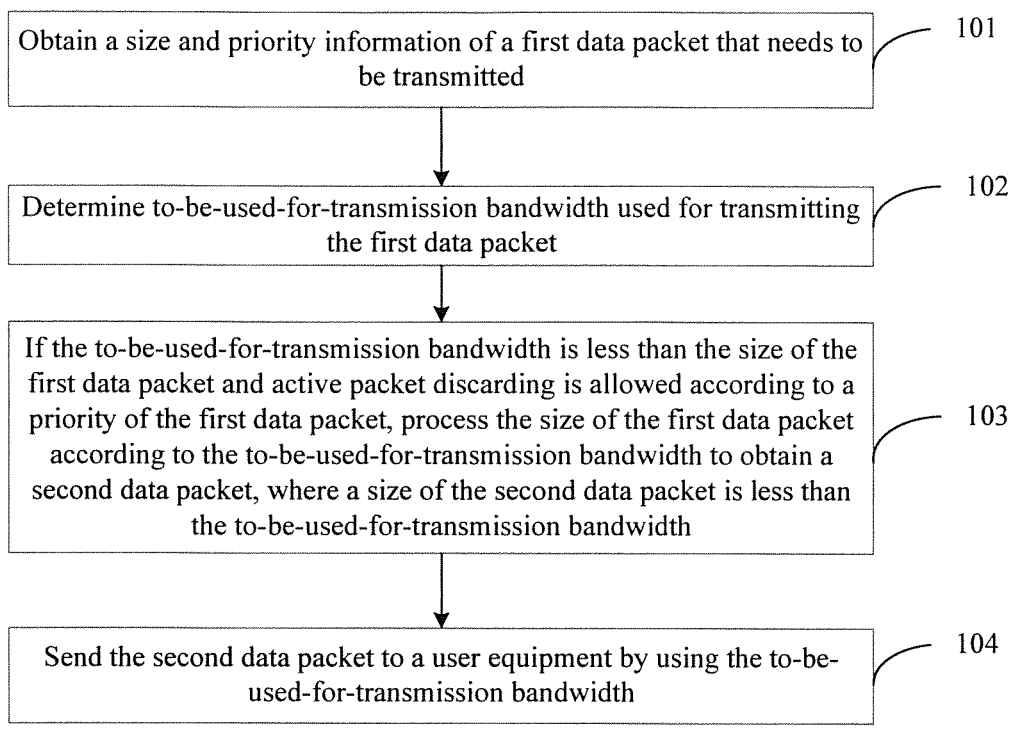
FIG. 1 is a flowchart of a data transmission method according to an embodiment of the present invention.

Referring to FIG. 1, FIG. 1 is a flowchart of a data transmission method according to an embodiment of the present invention. The method includes:

Step 101: Obtain a size and priority information of a first data packet that needs to be transmitted.

In this embodiment, a network side device (for example, an evolved NodeB eNB) may obtain, by means of deep packet inspection (DPI, Deep Packet Inspection) or by using another method, the priority information of the first data packet that needs to be transmitted currently, where the priority information of the first data packet may include a type of the first data packet, and certainly, may also include other information, which is not limited in this embodiment.

Using DPI in this embodiment specifically includes: using the DPI technology to check a data packet with supplemental enhancement information (SEI, Supplemental enhancement information) indicated by a special priority, check priority information in a header of an NAL unit, check a payload type (payload type PT, Payload Type) in a header of a Real-Time Transport Protocol (RTP, Real-time Transport Protocol) packet, and check a differentiated services code point (DSCP, Differentiated Services Code Point) field in an IP packet, and the like. Certainly, it is not limited thereto, and another detection manner may be further included and is not limited in this embodiment.

Step 102: Determine to-be-used-for-transmission bandwidth used for transmitting the first data packet.

The process of determining the to-be-used-for-transmission bandwidth of the first data packet is: a network side device (for example, an eNB) first obtains a current channel state and available channel bandwidth that is allocated, and then determines the to-be-used-for-transmission bandwidth used for transmitting the first data packet according to the current channel state and the available channel bandwidth.

In this embodiment, the network side device may obtain the current channel state by means of channel estimation or a channel quality indicator (CQI, Channel Quality Indicator) sent by a user equipment (UE, User Equipment); during scheduling, a media access control (MAC, Media Access Control) layer chooses currently appropriate transmit blocks (TBS, Transmit Blocks) according to the channel state, so as to determine a throughput of data to be transmitted. The TBS are looked up in a table by using an RB number and an MCS order; a resource block (RB, Resource Block) and a modulation and coding scheme (MCS, Modulation and Coding Scheme) are determined by using a scheduling algorithm; corresponding scheduling algorithms include a round robin algorithm, a maximum signal-to-interference ratio algorithm and a proportional fair algorithm, and the like. An actual throughput of the data to be transmitted is obtained by subtracting a corresponding overhead from a sum of TBS that are chosen by subframes.

Step 103: If the to-be-used-for-transmission bandwidth is less than the size of the first data packet and active packet discarding is allowed according to a priority of the first data packet, process the size of the first data packet according to the to-be-used-for-transmission bandwidth to obtain a second data packet, where a size of the second data packet is less than the to-be-used-for-transmission bandwidth.

For different transport protocols, a specific process of processing the size of the first data packet according to the to-be-used-for-transmission bandwidth to obtain the second data packet is different.

For example, if video data is transmitted between a base station and a user equipment by using the Real-Time Transport Protocol (RTP, Real-time Transport Protocol), the processing the size of the first data packet according to the to-be-used-for-transmission bandwidth to obtain the second data packet specifically includes: the base station first reserves header information (which includes header information at various layers, and includes RTP and IP header information in this embodiment) of the first data packet, and replaces a payload of the first data packet with a filled bit or supplemental enhancement information SEI to form the second data packet, where the payload of the first data packet may be replaced with a filled bit or supplemental enhancement information SEI with fewer bytes and the like.

For another example, if video data is transmitted between a base station and a user equipment by using the Transmission Control Protocol (TCP, Transmission Control Protocol), the processing the size of the first data packet according to the to-be-used-for-transmission bandwidth to obtain the second data packet specifically includes: replacing a payload of the first data packet with a filled bit or supplemental enhancement information SEI of a same length and check information, compressing the filled bit or supplemental enhancement information SEI and the check information that are used for the replacement, and modifying header information of the first data packet to obtain the second data packet.

The modifying header information of the first data packet includes: calculating a checksum of the first data packet that is obtained after the payload of the first data packet is replaced with the filled bit or supplemental enhancement information SEI of the same length and the check information, and adding the checksum to the header information of the first data packet.

Step 104: Send the second data packet to a user equipment by using the to-be-used-for-transmission bandwidth.

In this embodiment of the present invention, when a size of a first data packet that needs to be transmitted is greater than to-be-used-for-transmission bandwidth, a payload of the first data packet is replaced, so that a size of a second data packet obtained by the replacement is less than the to-be-used-for-transmission bandwidth, thereby facilitating transmission of the second data packet. This solves technical problems of low data transmission efficiency and an increased transmission delay in the prior art. Especially in a case in which resources are limited, a burden of an air interface can be lowered, transmission efficiency is improved, and a retransmission delay is reduced, thereby increasing service quality of video transmission.

In this embodiment, an execution sequence of step 101 and step 102 may be any one of the following: first execute step 102 and then execute step 101; first execute step 101 and then execute step 102; or execute step 101 and step 102 at the same time.

Figure 2:
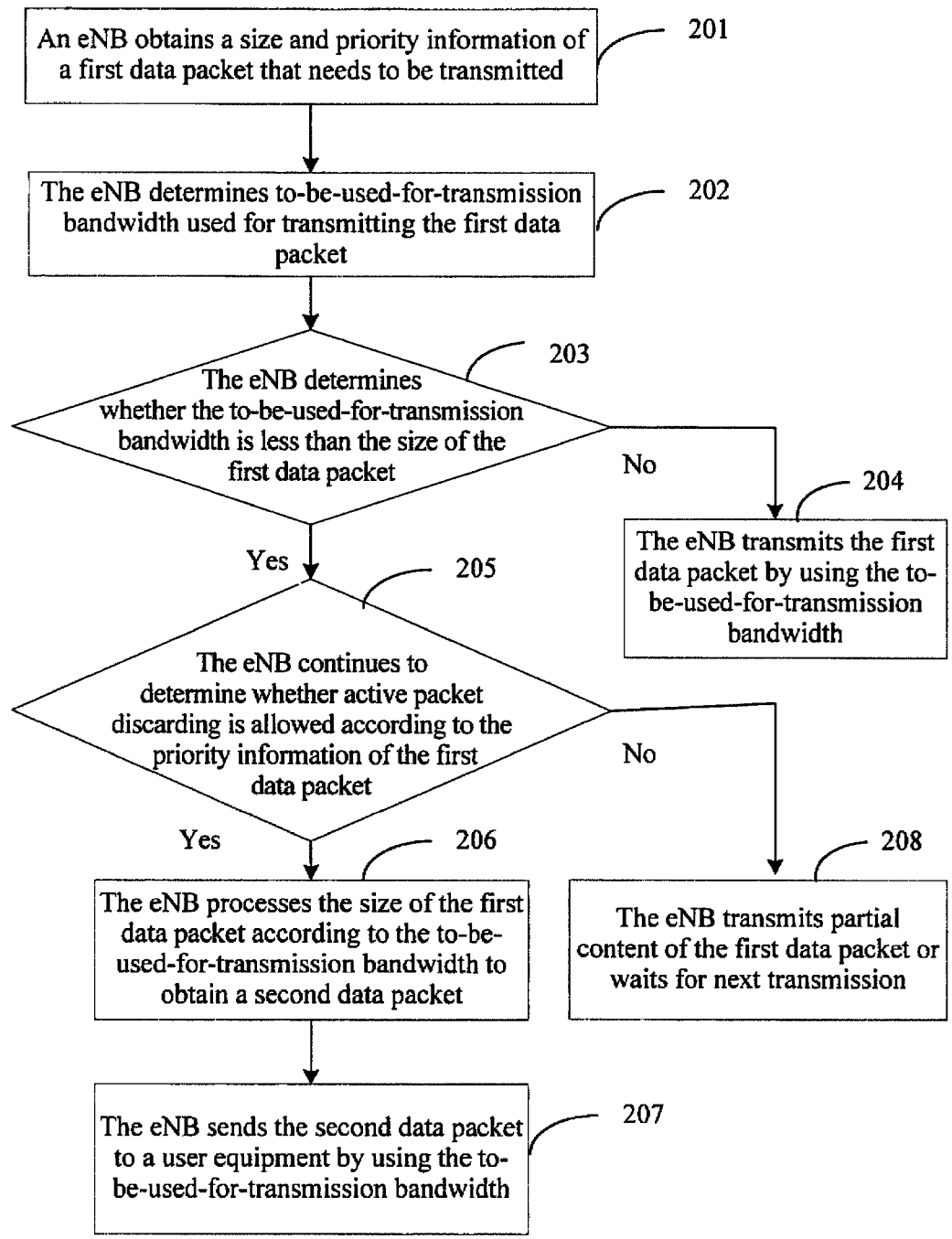
FIG. 2 is a flowchart of a data transmission method according to another embodiment of the present invention.

Further referring to FIG. 2, FIG. 2 is a flowchart of a data transmission method according to another embodiment of the present invention. In this embodiment, an eNB is used as an example of a network side device, which is not limited thereto. The method includes:

Step 201: An eNB obtains a size and priority information of a first data packet that needs to be transmitted.

This step is the same as the step 101. For details, refer to step 101, and details are not described herein again.

Step 202: The eNB determines to-be-used-for-transmission bandwidth used for transmitting the first data packet.

This step is the same as the step 102. For details, refer to step 102, and details are not described herein again.

Step 203: The eNB determines whether the to-be-used-for-transmission bandwidth is less than the size of the first data packet. If the to-be-used-for-transmission bandwidth is not less than the size of the first data packet, execute step 204; if the to-be-used-for-transmission bandwidth is less than the size of the first data packet, execute step 205.

That is, the eNB determines whether the to-be-used-for-transmission bandwidth is sufficient to transmit the first data packet. If the to-be-used-for-transmission bandwidth is sufficient to transmit the first data packet, execute step 204 directly; if the to-be-used-for-transmission bandwidth is insufficient to transmit the first data packet, execute step 205.

Step 204: The eNB transmits the first data packet by using the to-be-used-for-transmission bandwidth.

Step 205: The eNB continues to determine whether active packet discarding is allowed according to the priority information of the first data packet. If the active packet discarding is allowed according to the priority information of the first data packet, execute step 206 and step 207; if the active packet discarding is not allowed according to the priority information of the first data packet, execute step 208.

In this step, if a priority of the first data packet is relatively low or is less than a preset value, it is allowed to enter an active packet discarding mode; if the priority of the first data packet is relatively high or is greater than the preset value, it is not allowed to enter the active packet discarding mode, where the preset value may be preset according to an empirical value, and certainly, may also be adjusted dynamically.

Step 206: The eNB processes the size of the first data packet according to the to-be-used-for-transmission bandwidth to obtain a second data packet, where a size of the second data packet is less than the to-be-used-for-transmission bandwidth.

In this step, for details about the specific process of processing the size of the first data packet according to the to-be-used-for-transmission bandwidth, refer to a corresponding description in the foregoing embodiment, and details are not described herein again.

Step 207: The eNB sends the second data packet to a user equipment by using the to-be-used-for-transmission bandwidth.

Step 208: The eNB transmits partial content of the first data packet or waits for next transmission.

A specific process of transmitting a data packet is already well known to a person skilled in the art, and details are not described herein again.

That is, in this embodiment, after the to-be-used-for-transmission bandwidth used for transmitting the first data packet is determined, if the to-be-used-for-transmission bandwidth is not less than the size of the first data packet, the first data packet is transmitted by using the to-be-used-for-transmission bandwidth; or, if the to-be-used-for-transmission bandwidth is less than the size of the first data packet and the active packet discarding is not allowed according to the priority of the first data packet, the partial content of the first data packet is transmitted or next transmission is waited for.

In this embodiment of the present invention, when a size of a first data packet that needs to be transmitted is greater than to-be-used-for-transmission bandwidth, a payload of the first data packet is replaced, so that a size of a second data packet obtained by the replacement is less than the to-be-used-for-transmission bandwidth, thereby facilitating transmission of the second data packet. This solves technical problems of low data transmission efficiency and an increased transmission delay in the prior art.

Figure 3:
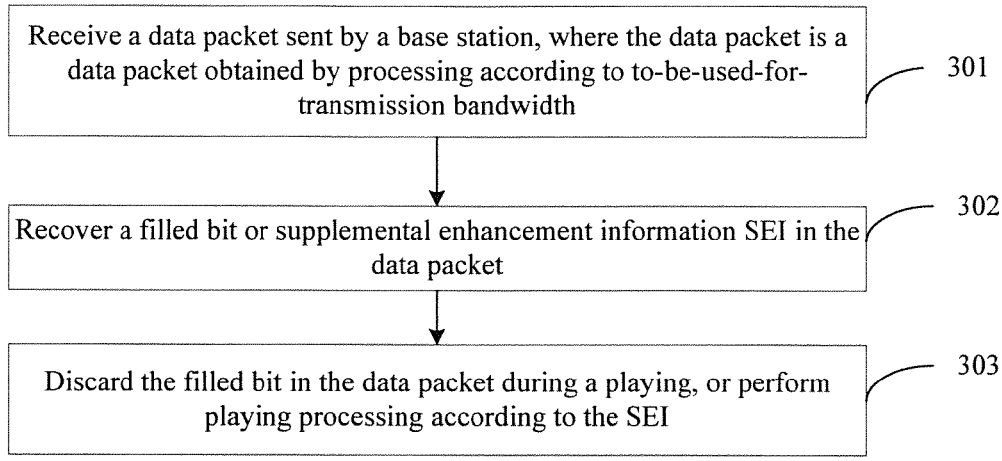
FIG. 3 is a flowchart of a data transmission method according to another embodiment of the present invention.

Further referring to FIG. 3, FIG. 3 is a flowchart of a data transmission method according to another embodiment of the present invention. The method includes:

Step 301: Receive a data packet sent by a base station, where the data packet is a data packet obtained by processing according to to-be-used-for-transmission bandwidth.

A user equipment receives a data packet sent by a network side device (for example, an evolved NodeB), where the data packet is a new data packet obtained after the network side device processes a size of an original data packet according to the to-be-used-for-transmission bandwidth, a size of the new data packet is less than the size of the original data packet, and the size of the new data packet is also less than the to-be-used-for-transmission bandwidth.

There are two types of processes in which the evolved NodeB processes the size of the data packet: (1) The evolved NodeB reserves header information of the data packet, and replaces a payload of the data packet with a filled bit or supplemental enhancement information SEI to form a new data packet; (2) The evolved NodeB replaces a payload of the data packet with a filled bit or supplemental enhancement information SEI of a same length and check information, compresses the filled bit or supplemental enhancement information SEI and the check information that are used for the replacement, and modifies header information of the data packet to obtain a new data packet.

Step 302: Recover a filled bit or supplemental enhancement information SEI in the data packet.

In this embodiment, for different transport protocols, a process of recovering the filled bit or supplemental enhancement info nation SEI in the data packet is different. If the protocol used between the user equipment and the evolved NodeB is RTP, after receiving the data packet, the user equipment merges payload content of the data packet into a code stream of the original video data packet at a transport layer. If the protocol used between the user equipment and the evolved NodeB is TCP, the evolved NodeB redesigns filled information of a same length and check information according to a length of the original data packet, recalculates a checksum of the data packet, and performs corresponding modification on TCP header information to form a new data packet.

Step 303: Discard the filled bit in the data packet during a playing, or perform playing processing according to the SEI.

During a playing by using a player, the user equipment may directly discard the filled bit obtained by the recovering, or perform corresponding playing processing according to information indication in an SEI packet.

In this embodiment of the present invention, after receiving a data packet, a user equipment directly discards a filled bit obtained by recovering when playing, or performs corresponding playing processing according to information indication in an SEI packet, thereby reducing the number of data retransmission times at a link control layer and a physical layer (L2/L1), reducing a timeout period at a transport layer, increasing air interface efficiency, and reducing a delay.

Figure 4:
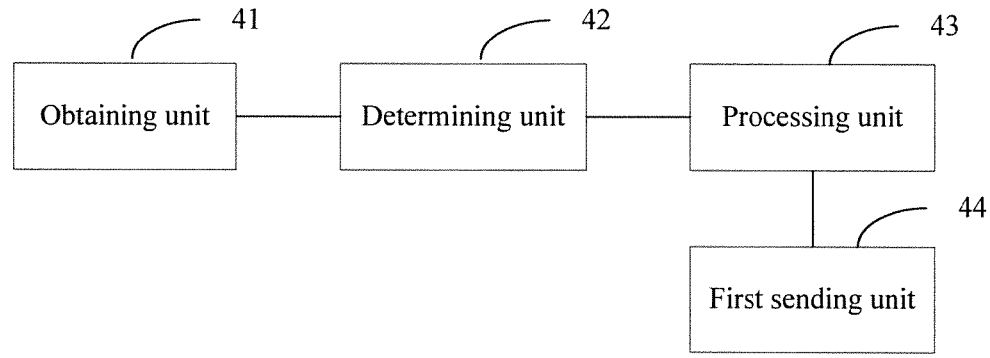
FIG. 4 is a schematic structural diagram of a data transmission apparatus according to an embodiment of the present invention.

Further referring to FIG. 4, FIG. 4 is a schematic structural diagram of a data transmission apparatus according to an embodiment of the present invention. The apparatus includes: an obtaining unit 41, a determining unit 42, a processing unit 43 and a first sending unit 44. The obtaining unit 41 is configured to obtain a size and priority information of a first data packet that needs to be transmitted; the determining unit 42 is configured to determine to-be-used-for-transmission bandwidth used for transmitting the first data packet; the processing unit 43 is configured to: when the to-be-used-for-transmission bandwidth is less than the size of the first data packet and active packet discarding is allowed according to a priority of the first data packet, process the size of the first data packet according to the to-be-used-for-transmission bandwidth to obtain a second data packet, where a size of the second data packet is less than the to-be-used-for-transmission bandwidth; the first sending unit 44 is configured to send the second data packet to a user equipment by using the to-be-used-for-transmission bandwidth.

Optionally, the determining unit includes: an obtaining unit and a determining subunit. The obtaining unit is configured to obtain a current channel state and available channel bandwidth that is allocated; the determining subunit is configured to determine the to-be-used-for-transmission bandwidth used for transmitting the first data packet according to the current channel state and the available channel bandwidth.

Optionally, in an embodiment, the processing unit may include: a reserving unit and a first replacing unit. The reserving unit is configured to: when the to-be-used-for-transmission bandwidth is less than the size of the first data packet and the active packet discarding is allowed according to the priority of the first data packet, reserve header info/Elation of the first data packet; the first replacing unit is configured to: when the reserving unit reserves the header information of the first data packet, replace a payload of the first data packet with a filled bit or supplemental enhancement information SEI to form a second data packet.

Optionally, in another embodiment, the processing unit includes: a second replacing unit, a compressing unit and a modifying unit. The second replacing unit is configured to: when the to-be-used-for-transmission bandwidth is less than the size of the first data packet and the active packet discarding is allowed according to the priority of the first data packet, replace a payload of the first data packet with a filled bit or supplemental enhancement information SEI of a same length and check information; the compressing unit is configured to compress the filled bit or supplemental enhancement information SEI and the check information that are used for the replacement by the second replacing unit; the modifying unit is configured to modify header information of the first data packet to obtain a second data packet.

The modifying unit includes: a calculating unit and an adding unit. The calculating unit is configured to calculate a checksum of the first data packet that is obtained after the payload of the first data packet is replaced with the filled bit or supplemental enhancement information SEI of the same length and the check information; the adding unit is configured to add the checksum to the header information of the first data packet.

Optionally, based on the foregoing embodiments, the apparatus may further include: a first judging unit, a second sending unit, a second judging unit and a third sending unit. The first judging unit is configured to: after the determining unit determines the to-be-used-for-transmission used bandwidth for transmitting the first data packet, determine whether the to-be-used-for-transmission bandwidth is less than the size of the first data packet; and send, to the second sending unit, a result of the determining indicating that the to-be-used-for-transmission bandwidth is not less than the size of the first data packet, or send, to the second judging unit, a result of the determining indicating that the to-be-used-for-transmission bandwidth is less than the size of the first data packet. The second sending unit is configured to transmit the first data packet by using the to-be-used-for-transmission bandwidth when receiving the result of the determining that is sent by the first judging unit and indicates that the to-be-used-for-transmission bandwidth is not less than the size of the first data packet. The second judging unit is configured to: continue to determine whether the active packet discarding is allowed according to the priority of the first data packet when receiving the result of the determining that is sent by the first judging unit and indicates that the to-be-used-for-transmission bandwidth is less than the size of the first data packet; and send, to the processing unit, a result of the determining indicating that the active packet discarding is allowed according to the priority of the first data packet, or send, to the third sending unit, a result of the determining indicating that the active packet discarding is not allowed according to the priority of the first data packet. The processing unit is further configured to process the size of the first data packet according to the to-be-used-for-transmission bandwidth to obtain the second data packet when receiving the result of the determining that is sent by the second judging unit and indicates that the active packet discarding is allowed according to the priority of the first data packet. The third sending unit is configured to transmit partial content of the first data packet or wait for next transmission when receiving the result of the determining that is sent by the second judging unit and indicates that the active packet discarding is not allowed according to the priority of the first data packet.

For details about processes of implementing functions and roles of the units in the apparatus, refer to the implementation processes of the corresponding steps in the foregoing methods, and details are not described herein again.

Figure 5:
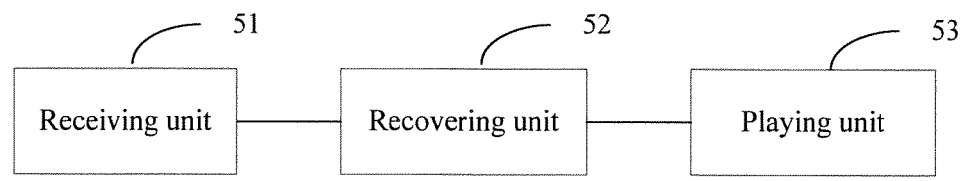
FIG. 5 is a schematic structural diagram of a data transmission apparatus according to another embodiment of the present invention.

Further referring to FIG. 5, FIG. 5 is a schematic structural diagram of a data transmission apparatus according to another embodiment of the present invention. The apparatus includes: a receiving unit 51, a recovering unit 52 and a playing unit 53. The receiving unit 51 is configured to receive a data packet sent by a base station, where the data packet is a data packet obtained by processing according to to-be-used-for-transmission bandwidth; the recovering unit 52 is configured to recover a filled bit or supplemental enhancement information SEI in the data packet; the playing unit 53 is configured to discard the filled bit in the data packet during a playing, or perform playing processing according to the SEI.

Optionally, the apparatus may further include: a judging unit and a decompressing unit. The judging unit is configured to determine whether the data packet is a compressed data packet, and send, to the decompressing unit, a result of the determining indicating that the data packet is a compressed data packet; the decompressing unit is configured to decompress the data packet to obtain the filled bit or supplemental enhancement information SEI in the data packet when receiving the result of the determining that is sent by the judging unit and indicates that the data packet is a compressed data packet.

For details about processes of implementing functions and roles of the units in the apparatus, refer to the implementation processes of the corresponding steps in the foregoing methods, and details are not described herein again.

Figure 6:
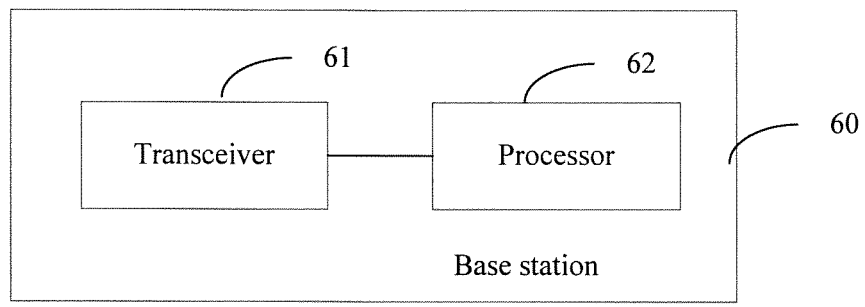
FIG. 6 is a schematic structural diagram of a base station according to an embodiment of the present invention.

Further referring to FIG. 6, FIG. 6 is a schematic structural diagram of a base station according to an embodiment of the present invention. The base station 60 includes: a transceiver 61 and a processor 62. The processor 62 is configured to: obtain a size and priority information of a first data packet that needs to be transmitted; determine to-be-used-for-transmission bandwidth used for transmitting the first data packet; and when the to-be-used-for-transmission bandwidth is less than the size of the first data packet and active packet discarding is allowed according to a priority of the first data packet, process the size of the first data packet according to the to-be-used-for-transmission bandwidth to obtain a second data packet, where a size of the second data packet is less than the to-be-used-for-transmission bandwidth. The transceiver 61 is configured to send the second data packet to a user equipment by using the to-be-used-for-transmission bandwidth.

Optionally, the transceiver is further configured to obtain a current channel state and available channel bandwidth that is allocated.

The processor is further configured to determine the to-be-used-for-transmission bandwidth used for transmitting the first data packet according to the current channel state and the available channel bandwidth.

Optionally, in an embodiment, that the processor processes the size of the first data packet according to the to-be-used-for-transmission bandwidth to obtain the second data packet includes that: the processor reserves header information of the first data packet and replaces a payload of the first data packet with a filled bit or supplemental enhancement information SEI to form the second data packet.

Optionally, in another embodiment, that the processor processes the size of the first data packet according to the to-be-used-for-transmission bandwidth to obtain the second data packet includes that: the processor replaces a payload of the first data packet with a filled bit or supplemental enhancement information SEI of a same length and check information, compresses the filled bit or supplemental enhancement information SEI and the check information that are used for the replacement, and modifies header information of the first data packet to obtain the second data packet.

Optionally, that the processor modifies the header information of the first data packet includes that: the processor calculates a checksum of the first data packet that is obtained after the payload of the first data packet is replaced with the filled bit or supplemental enhancement information SEI of the same length and the check information, and adds the checksum to the header information of the first data packet.

Optionally, the processor is further configured to: after determining the to-be-used-for-transmission bandwidth used for transmitting the first data packet, determine whether the to-be-used-for-transmission bandwidth is less than the size of the first data packet; if the to-be-used-for-transmission bandwidth is not less than the size of the first data packet, control the transceiver to transmit the first data packet by using the to-be-used-for-transmission bandwidth; if the to-be-used-for-transmission bandwidth is less than the size of the first data packet, continue to determine whether the active packet discarding is allowed according to the priority information of the first data packet; if the active packet discarding is allowed according to the priority information of the first data packet, process the size of the first data packet according to the to-be-used-for-transmission bandwidth to obtain the second data packet; and if the active packet discarding is not allowed according to the priority information of the first data packet, control the transceiver to transmit partial content of the first data packet or wait for next transmission.

For details about processes of implementing functions and roles of the transceiver and the processor in the base station, refer to the implementation processes of the corresponding steps in the foregoing methods, and details are not described herein again.

Figure 7:
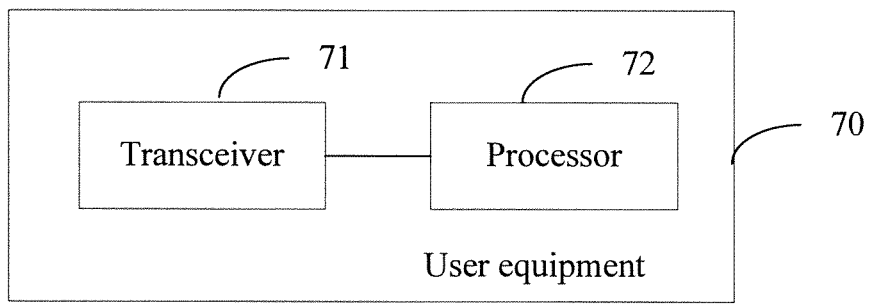
FIG. 7 is a schematic structural diagram of a user equipment according to an embodiment of the present invention.

Further referring to FIG. 7, FIG. 7 is a schematic structural diagram of a user equipment according to an embodiment of the present invention. The user equipment 70 includes: a transceiver 71 and a processor 72. The transceiver 71 is configured to receive a data packet sent by a base station, where the data packet is a data packet obtained by processing according to to-be-used-for-transmission bandwidth; the processor 72 is configured to recover a filled bit or supplemental enhancement information SEI in the data packet, and discard the filled bit in the data packet during a playing, or perform playing processing according to the SEI.

Optionally, the processor is further configured to: determine whether the data packet is a compressed data packet; and if the data packet is a compressed data packet, decompress the data packet to obtain the filled bit or supplemental enhancement information SEI in the data packet.

In this embodiment of the present information, because a size of a data packet obtained by processing according to to-be-used-for-transmission bandwidth is relatively small, a modulation and coding scheme (MCS, Modulation and Coding Scheme) with a relatively low modulation order may be adopted, so as to ensure that a packet discarding probability is very small. This can effectively increase transmission efficiency of an air interface, reduce the number of HARQ times at a physical layer, and reduce wait time and the number of retransmission times at an upper layer, thereby achieving a purpose of reducing a delay.

To facilitate understanding for a person skilled in the art, the following uses specific application examples for description.

Figure 8:
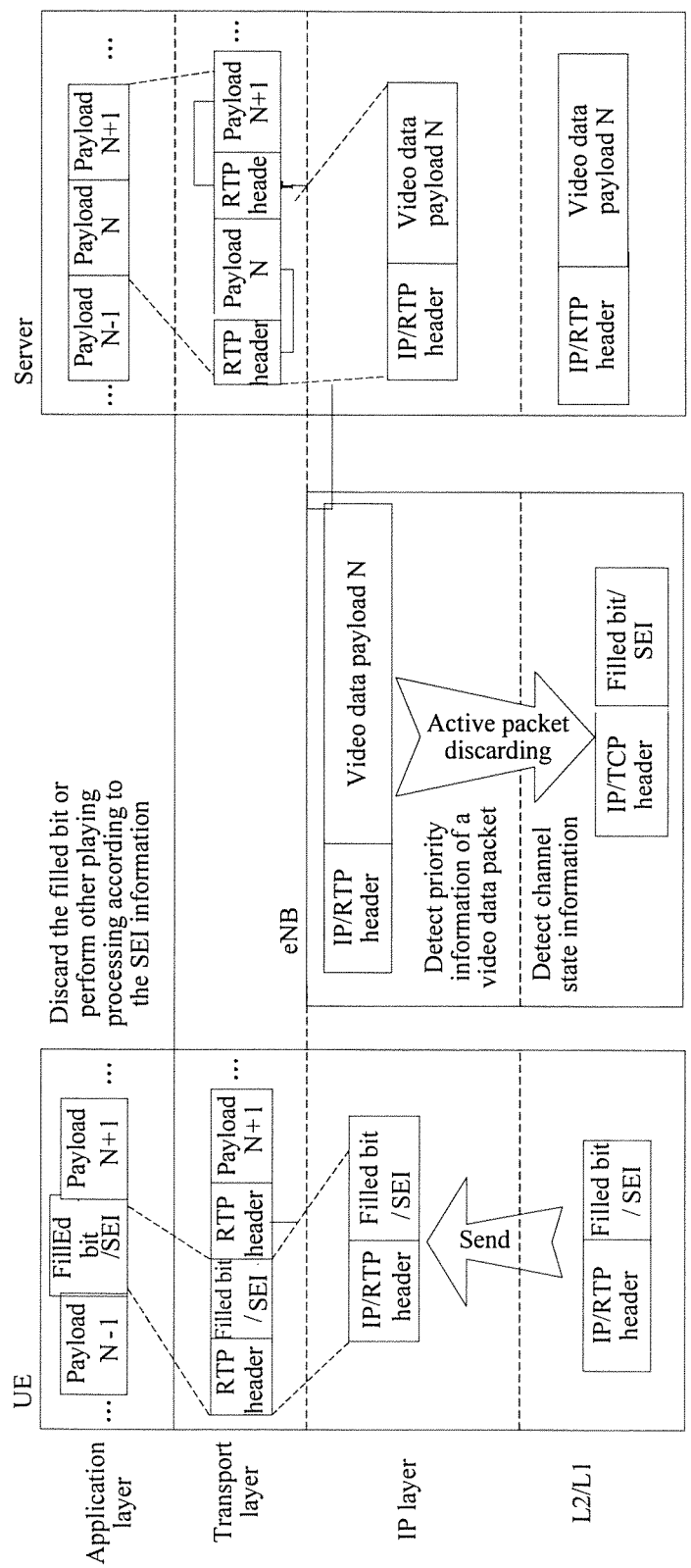
FIG. 8 is a schematic diagram of active packet discarding when video data is transmitted by using the RTP according to an embodiment of the present invention.

Further referring to FIG. 8, FIG. 8 is a schematic diagram of active packet discarding when video data is transmitted by using the RTP according to an embodiment of the present invention. In the RTP, data is transmitted based on each data packet. A lost data packet does not need to be retransmitted at a transport layer, and received data packets need to be sequenced and sent to an application layer after a timeout occurs only.

Assume that an eNB detects bearing of an RTP real-time video stream and that a video payload data packet N is a data packet with a low priority that can be discarded actively (an IP packet is used as an example), a process of actively discarding the packet by the eNB is as follows:

1) the eNB checks the IP packet, detects the priority of the video payload data packet N to be transmitted at that moment, and also detects a currently-allocated available transmission resource at the MAC layer, and then feeds back to an upper layer (for example, an IP/PDCP layer) corresponding information (for example, 1 bit indicates whether bandwidth is sufficient, or multiple bits indicate a magnitude of current bandwidth);

2) the eNB determines, according to the current available transmission resource, whether to enter an active packet discarding mode. If the active packet discarding mode need to be entered, the eNB reserves video data in the original IP packet; if the active packet discarding mode does not need to be entered, the eNB replaces a payload of the original video data with a filled byte or a small meaningful SEI packet, also reserves RTP and IP header information to form a new data packet, and sends the new data packet to a UE; and 3) after receiving the new data packet correctly, the UE merges payload content of the new data packet into a code stream of the original video data packet at the transport layer, and may directly discard the filled bit during a playing by using a player, or perform corresponding playing processing according to information indication in the SEI packet.

In this embodiment, if an active packet discarding scheme provided in the embodiment of the present invention is adopted, the number of ARQ and HARQ times at L2/L1 (a link control layer and a physical layer) can be reduced, and a waiting timeout period at a transport layer can be reduced, thereby increasing transmission efficiency of an air interface and reducing a delay.

Figure 9:
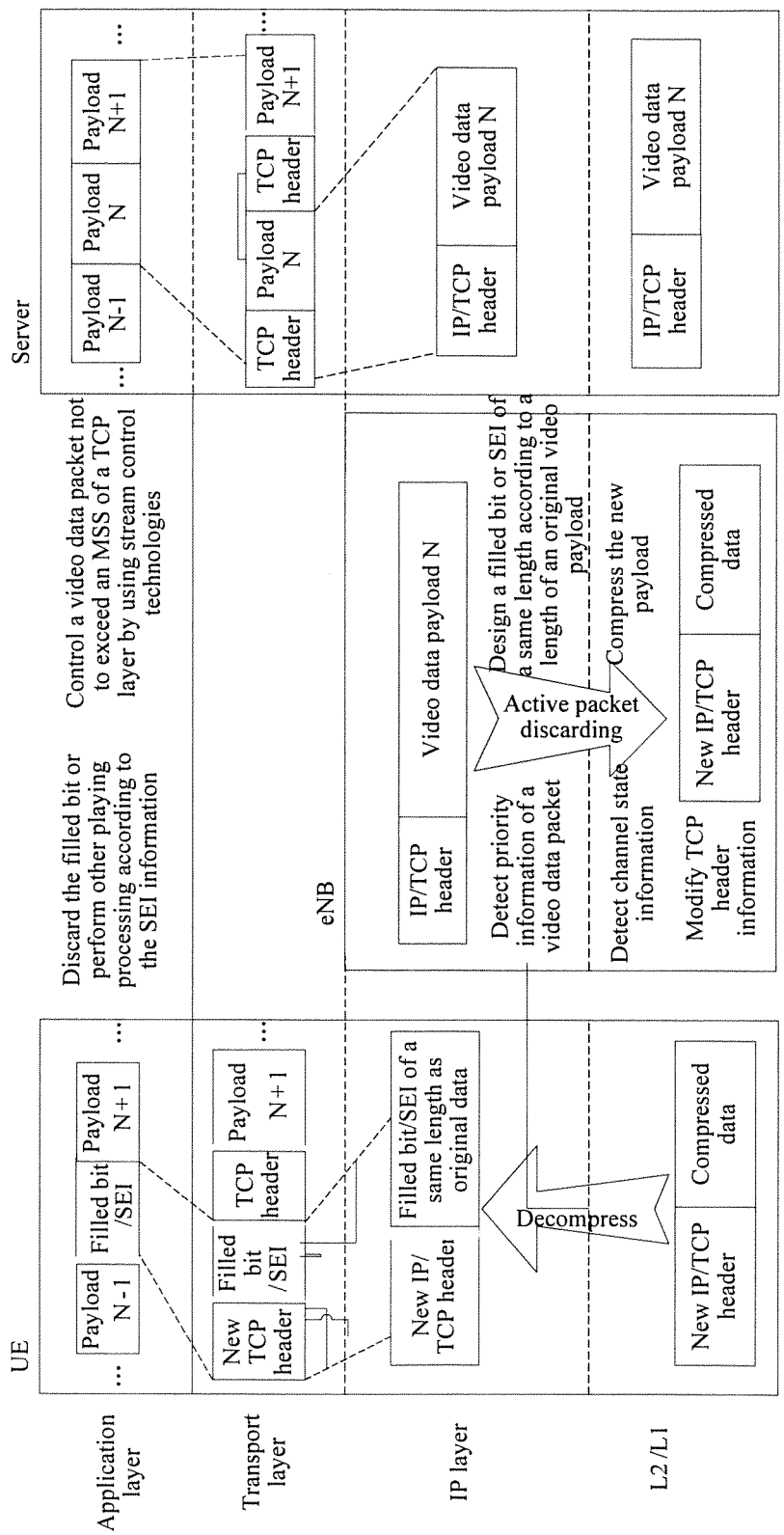
FIG. 9 is a schematic diagram of active packet discarding when video data is transmitted by using the TCP according to an embodiment of the present invention.
Figure 10:
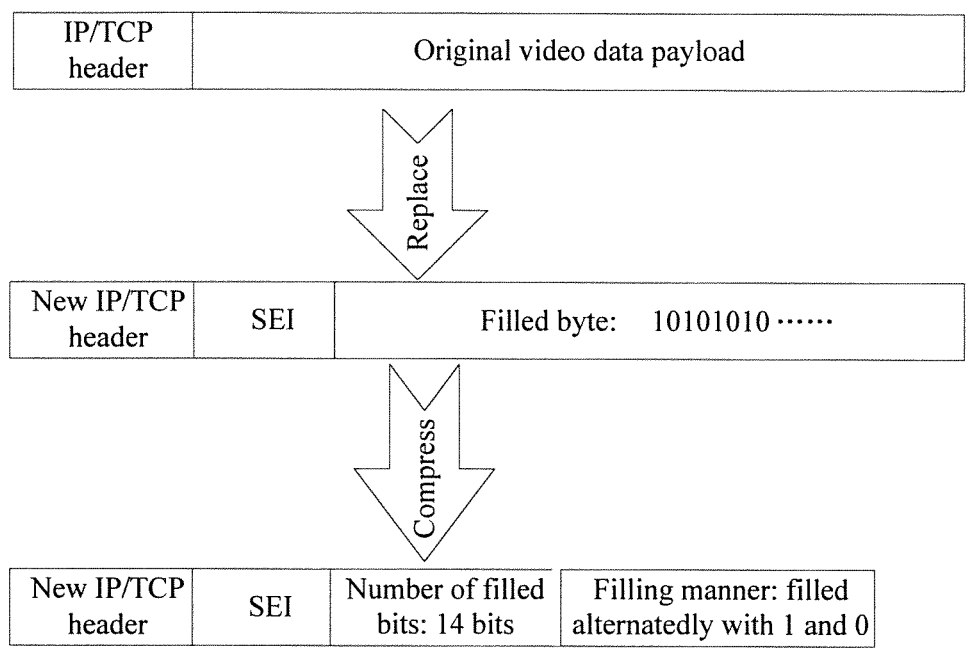
FIG. 10 is a schematic diagram of a data compression manner in the TCP according to an embodiment of the present invention.

Further referring to FIG. 9, FIG. 9 is a schematic diagram of active packet discarding when video data is transmitted by using the TCP according to an embodiment of the present invention. In the TCP, data is transmitted reliably based on a byte stream. When encoding a video, a server needs to adopt some flow control technologies to ensure that a coded video data packet is less than or equal to a maximum packet size MSS that is allowed for TCP transmission, so as to prevent the video data packet from being segmented by the TCP protocol at the transport layer. On the other hand, a TCP packet loss may cause retransmission at the transport layer, leading to a relatively large delay. A TCP receiving end may check a length and a checksum of data. In this embodiment, to prevent retransmission of a lost packet caused by a checksum check error, corresponding modification needs to be made to 2) and 3) in the foregoing embodiment, which is specifically:

2) the eNB determines, according to the current available transmission resource, whether to enter an active packet discarding mode. If the active packet discarding mode does not need to be entered, the eNB reserves video data in the original IP packet; the eNB redesigns filled information and check information of a same length according to a length of the original data packet, recalculates a checksum of the data packet, and correspondingly modifies TCP header information to form a new data packet; the eNB performs corresponding compression on the new data packet according to the currently available transmission resource. Details are shown in FIG. 10, and FIG. 10 is a schematic diagram of a data compression manner in the TCP;

as shown in FIG. 10, it is indicated, at a MAC layer, that the data packet has already been compressed, and an indication method includes but is not limited to: implementing the indication by using an LCID field of a MAC header;

3) after receiving the data packet, the UE checks whether the MAC header is a compressed data packet, decompresses the data packet to a filled/SEI data packet of a length same as that of the original video data packet if the MAC header is a compressed data packet, and then submits the filled/SEI data packet to an upper layer.

It can be known from this embodiment, after an active packet discarding solution in this embodiment of the present invention is adopted, TCP retransmission caused by a data packet transmission failure due to a limited channel resource can be effectively prevented for the TCP, thereby reducing an end-to-end delay of video transmission and improving user QoE.

In an LTE/LTE-A wireless communications system, by adopting the active packet discarding technology provided in the embodiments of the present invention, good video transmission performance can be obtained, overheads of an air interface and a video transmission delay can be reduced, and user QoE can be improved. That is, in the embodiments of the present invention, an eNB checks a current channel state, a resource allocation condition, and a size and priority information of a video data packet to be transmitted, and replaces original video data correspondingly, so that a transmission packet is significantly reduced, thereby reducing a burden of an air interface. Transmission of a small data packet can increase a transmission success rate and reduce waiting timeouts and the number of retransmission times at various layers of the LTE protocol stack, thereby reducing an end-to-end delay.

The embodiments of the present invention may further be used for a video communications system with limited air interface resources and a relatively high user requirement for a delay, including but not limited to a system such as LTE/LTE-A/LTE-Hi. In addition, the embodiments of the present invention may further be used for another multimedia transmission system that supports priority-based differentiation, for example, a video or image transmission system.

In the embodiments of the present invention, a user equipment (UE, User Equipment) may be any one of the following and may be still or moving. A still UE may specifically be a terminal (terminal), a mobile station (mobile station), a subscriber unit (subscriber unit), a station (station), or the like. A moving UE may specifically be a cellular phone (cellular phone), a personal digital assistant (PDA, personal digital assistant), a wireless modem (modem), a wireless communications device, a handheld device (handheld), a laptop computer (laptop computer), a cordless phone (cordless phone), a wireless local loop (WLL, wireless local loop) station, or the like. The UE may be distributed in an entire wireless network.

It should be noted that in the specification, relational terms such as first and second are used only to differentiate an entity or operation from another entity or operation, and do not require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

Based on the foregoing descriptions of the embodiments, a person skilled in the art may clearly understand that the present invention may be implemented by software in addition to a necessary universal hardware platform or by hardware only. In most circumstances, the former is a preferred implementation manner. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, a network device, or the like) to perform the methods described in the embodiments or some parts of the embodiments of the present invention.

The foregoing descriptions are merely exemplary implementation manners of the present invention. It should be noted that a person of ordinary skill in the art may make certain improvements or polishing without departing from the principle of the present invention and the improvements or polishing shall fall within the protection scope of the present invention.

What is claimed is:

1. A data transmission method, comprising:
   obtaining a size and priority information of a first data packet that needs to be transmitted;
   determining a transmission bandwidth used for transmitting the first data packet;
   when the transmission bandwidth is less than the size of the first data packet and it is determined, according to the priority information of the first data packet, that active packet discarding is allowed, processing the first data packet to obtain a second data packet, wherein a size of the second data packet is less than the transmission bandwidth, wherein processing the first data packet to obtain the second data packet comprises:
      replacing a payload of the first data packet with a filled bit or supplemental enhancement information (SEI) of a same length and check information,
      compressing the filled bit or the SEI and the check information that are used for the replacement, and
      modifying header information of the first data packet, to obtain the second data packet; and
   sending the second data packet to a user equipment by using the transmission bandwidth.

2. The method according to claim 1, wherein processing the first data packet to obtain a second data packet comprises:
   reserving header information of the first data packet.

3. The method according to claim 1, wherein modifying the header information of the first data packet comprises:
   calculating a checksum of the first data packet that is obtained after the payload of the first data packet is replaced with the filled bit or the SEI of the same length and the check information; and
   adding the checksum to the header information of the first data packet.

4. The method according to claim 1, wherein determining the transmission bandwidth used for transmitting the first data packet comprises:
   obtaining a current channel state and available channel bandwidth that is allocated; and
   determining the transmission bandwidth used for transmitting the first data packet according to the current channel state and the available channel bandwidth.

5. The method according to claim 1, wherein after determining the transmission bandwidth used for transmitting the first data packet, the method further comprises:
   when the transmission bandwidth is not less than the size of the first data packet, transmitting the first data packet by using the transmission bandwidth; or
   when the transmission bandwidth is less than the size of the first data packet and the active packet discarding is not allowed according to the priority information of the first data packet, transmitting partial content of the first data packet or waiting for next transmission.

6. A data transmission method, comprising:
   receiving a modified data packet sent by a base station, wherein the modified data packet is a data packet obtained by processing, by the base station, a first data packet to obtain the modified data packet, wherein processing the first data packet to obtain the modified data packet comprises:
      replacing a payload of the first data packet with a filled bit or supplemental enhancement information (SEI) of a same length and check information,
      compressing the filled bit or the SEI and the check information that are used for the replacement, and
      modifying header information of the first data packet, to obtain the modified data packet;
   recovering the filled bit or the SEI in the data packet; and
   discarding the filled bit in the data packet during a playing, or performing playing processing according to the SEI.

7. The method according to claim 6, further comprising:
   determining whether the data packet is a compressed data packet, and when the data packet is a compressed data packet, decompressing the data packet to obtain the filled bit or the SEI in the data packet.

8. A base station, comprising:
   a processor, configured to:
      obtain a size and priority information of a first data packet that needs to be transmitted,
      determine a transmission bandwidth used for transmitting the first data packet, and
      when the transmission bandwidth is less than the size of the first data packet and it is determined, according to the priority information of the first data packet, that active packet discarding is allowed, process the size of the first data packet to obtain a second data packet, wherein a size of the second data packet is less than the transmission bandwidth;

a transceiver, configured to send the second data packet to a user equipment by using the transmission bandwidth; and wherein the processor is further configured to replace a payload of the first data packet with a filled bit or supplemental enhancement information (SEI) of a same length and check information, compress the filled bit or the SEI and the check information that is used for the replacement, and modify header information of the first data packet to obtain the second data packet.

9. The base station according to claim 8, wherein:

the transceiver is further configured to obtain a current channel state and available channel bandwidth that is allocated; and the processor is further configured to determine the transmission bandwidth used for transmitting the first data packet according to the current channel state and the available channel bandwidth.

10. The base station according to claim 8, wherein the processor is further configured to reserve header information of the first data packet.

11. The base station according to claim 8, wherein the processor is further configured to calculate a checksum of the first data packet that is obtained after the payload of the first data packet is replaced with the filled bit or the SEI of the same length and the check information, and add the checksum to the header information of the first data packet.

12. A base station, comprising:

a processor, configured to:

obtain a size and priority information of a first data packet that needs to be transmitted, determine a transmission bandwidth used for transmitting the first data packet, and when the transmission bandwidth is less than the size of the first data packet and it is determined, according to the priority information of the first data packet, that active packet discarding is allowed, process the size of the first data packet to obtain a second data packet, wherein a size of the second data packet is less than the transmission bandwidth;

a transceiver, configured to send the second data packet to a user equipment by using the transmission bandwidth; and wherein the processor is further configured to:

after determining the transmission bandwidth used for transmitting the first data packet, determine whether the transmission bandwidth is less than the size of the first data packet;

when the transmission bandwidth is not less than the size of the first data packet, control the transceiver to transmit the first data packet by using the transmission bandwidth;

when the transmission bandwidth is less than the size of the first data packet, continue to determine whether the active packet discarding is allowed according to the priority information of the first data packet;

when the active packet discarding is allowed according to the priority information of the first data packet, process the size of the first data packet according to the transmission bandwidth to obtain the second data packet; and when the active packet discarding is not allowed according to the priority information of the first data packet, control the transceiver to transmit partial content of the first data packet or wait for next transmission.

13. A user equipment, comprising:

a transceiver, configured to receive a modified data packet sent by a base station, wherein the modified data packet is a data packet obtained by processing, by the base station, a first data packet to obtain the modified data packet, wherein the first data packet is processed to obtain the modified data packet such that:

a payload of the first data packet is replaced with a filled bit or supplemental enhancement information (SEI) of a same length and check information, the filled bit or the SEI and the check information that are used for the replacement is compressed, and header information of the first data packet is modified, to obtain the modified data packet; and a processor, configured to recover the filled bit or the SEI in the data packet, and discard the filled bit in the data packet during a playing, or perform processing according to the SEI.

14. The user equipment according to claim 13, wherein the processor is further configured to:

determine whether the data packet is a compressed data packet; and when the data packet is a compressed data packet, decompress the data packet to obtain the filled bit or the SEI in the data packet.

* * * * *